(12) United States Patent
Motschi

(10) Patent No.: US 11,583,940 B2
(45) Date of Patent: Feb. 21, 2023

(54) CLAMPING DEVICE FOR CLAMPING A TOOL OR WORK PIECE

(71) Applicant: Schaublin SA, Delémont (CH)

(72) Inventor: René Motschi, Oberbuchsiten (CH)

(73) Assignee: Schaublin SA, Delemont (CH)

( * ) Notice: Subject to any disclaimer, the term of this patent is extended or adjusted under 35 U.S.C. 154(b) by 47 days.

(21) Appl. No.: 17/189,425

(22) Filed: Mar. 2, 2021

(65) Prior Publication Data

US 2021/0276107 A1     Sep. 9, 2021

Related U.S. Application Data

(60) Provisional application No. 62/985,523, filed on Mar. 5, 2020.

(51) Int. Cl.
    *B23B 31/20*      (2006.01)
    *B23B 31/26*      (2006.01)

(52) U.S. Cl.
    CPC .......... *B23B 31/20* (2013.01); *B23B 31/265* (2013.01)

(58) Field of Classification Search
    CPC .............................. B23B 31/20; B23B 31/265
    See application file for complete search history.

(56) References Cited

U.S. PATENT DOCUMENTS

| | | | |
|---|---|---|---|
| 2,922,322 A | 1/1960 | Kleine | |
| 3,202,431 A | 8/1965 | Moody | |
| 4,122,755 A * | 10/1978 | Johnson | B23B 31/265 408/238 |
| 5,443,275 A | 8/1995 | Knobl et al. | |
| 6,481,940 B2 * | 11/2002 | Prust | B23B 31/265 409/233 |
| 6,598,884 B1 | 7/2003 | McCluskey et al. | |
| 7,252,467 B2 | 8/2007 | Miller | |
| 7,320,568 B2 | 1/2008 | Matsumoto et al. | |
| 7,500,811 B2 | 3/2009 | Pfob | |

(Continued)

FOREIGN PATENT DOCUMENTS

| EP | 3147053 A1 | 3/2017 |
|---|---|---|
| GB | 2279277 A | 1/1995 |

(Continued)

OTHER PUBLICATIONS

Extended European Search Report issued in corresponding EP Application No. 21160122.4, dated Jul. 30, 2021, pp. 1-8.

*Primary Examiner* — Eric A. Gates
(74) *Attorney, Agent, or Firm* — Robinson & Cole LLP

(57) ABSTRACT

A clamping device has a main body with a bore that extends from a back to a front end thereof. The bore has a fastening area proximate the back end, a front-end axial abutment surface and a central axial abutment surface. A centering sleeve is disposed in the bore and extends axially between a centering sleeve first and second axial end. A guide sleeve is disposed in the bore and partially in the centering sleeve. The guide sleeve extends axially between a guide sleeve first and second axial end. A locking member is removably disposed in the fastening area, has a tapered abutment surface and faces the front end. The centering sleeve is axially retained by and between the tapered abutment surface and the central axial abutment surface. The guide sleeve is axially retained by the tapered abutment surface and the central axial abutment surface.

9 Claims, 5 Drawing Sheets

(56) References Cited

U.S. PATENT DOCUMENTS

| | | | |
|---|---|---|---|
| 7,704,022 B2 * | 4/2010 | Petrescu | B23Q 1/70 409/231 |
| 9,102,582 B2 | 8/2015 | Miller et al. | |
| 9,248,508 B2 | 2/2016 | Motschi et al. | |
| 9,302,305 B2 | 4/2016 | Kerscher | |
| 9,649,696 B2 | 5/2017 | Teusch | |
| 9,999,930 B2 | 6/2018 | Hecht et al. | |
| 2010/0253016 A1 | 10/2010 | Terwilliger et al. | |
| 2019/0111555 A1 | 4/2019 | Abbott | |
| 2020/0130067 A1 * | 4/2020 | Makabe | B23Q 17/005 |

FOREIGN PATENT DOCUMENTS

| | | | | |
|---|---|---|---|---|
| KR | 20090116645 A | * | 11/2009 | |
| WO | WO-2006059739 A1 | * | 6/2006 | B23B 13/024 |
| WO | 2013041118 A1 | | 3/2013 | |
| WO | 2017186462 A1 | | 4/2017 | |
| WO | WO-2017215881 A1 | * | 12/2017 | B23B 31/207 |
| WO | 2019038146 A1 | | 2/2019 | |

* cited by examiner

CLAMPING DEVICE FOR CLAMPING A TOOL OR WORK PIECE

CROSS REFERENCE TO RELATED APPLICATION

This application claims the benefit of U.S. Provisional Patent Application Ser. No. 62/985,523 filed on Mar. 5, 2020, which is incorporated herein by reference in its entirety.

FIELD OF THE INVENTION

This invention relates to a clamping device for clamping a tool or work piece and more particularly to a clamping device having a main body with a centering sleeve disposed therein and a guide sleeve disposed in the main body and a portion of the centering sleeve.

BACKGROUND

A collet is a device having two or more "jaws" between which an object such as a tool or a work piece can be positioned, the jaws forming a collar around the object. The jaws of the collet are configured to constrict around the object and exert a clamping force. In one type of collet, constriction of the jaws may be affected by pushing a suitable mechanism around the circumference of the collet. In another type of collet called a draw-in collet, the collet is tapered and drawn into a sleeve to cause the jaws to constrict around the tool or work piece. Collets are typically fabricated from steel, which allows the jaws to be sufficiently flexible relative to each other to facilitate the constriction of the tool or work piece.

With regard to either type, the collet is held in a clamping device, which is connected to a shaft that can be rotated, which in turn causes the tool or the work piece to rotate. In instances in which a tool is clamped in the collet and rotated, the tool is made to engage or be engaged by a work piece. In instances in which the work piece is clamped in the collet and rotated, the work piece engages or is engaged by a tool.

The rotational accuracy of the tool or the work piece affects the process of removing swarf from the work piece. In particular, the rotational accuracy of the tool or the work piece is typically a function of concentricity along the axis of rotation. Once clamped into a machine tool such as a lathe or a grinding machine, the tool or work piece is adjusted to attain concentricity upon rotation. The concentricity achieved with mechanical clamping is often inadequate or compromised during rotation, thereby resulting in runout, which will detrimentally affect the finished work piece. Concentricity is often adjusted numerous times during an operation of a machine tool. For example, some guiding sleeves that guide collets introduce additional runout because they cannot be precision ground in place in the main body. In addition, some guiding sleeves are made of materials that tend to flexibly deform during use. Furthermore, some guiding sleeves are merely held in place by friction and tend to undesirably move towards the front end of the main body when the collet is removed from the guiding sleeve. In addition, some prior art clamping systems require separate centering sleeves and/or guiding sleeves for each size collet, which adds time to set up.

SUMMARY

There is disclosed herein a clamping device for clamping a tool or work piece. The clamping device includes a main body that has a stepped bore which extends from a back end to a front end of the main body. The stepped bore has a fastening area located proximate the back end. A front-end axial abutment surface axially faces the back end and a central axial abutment surface axially faces the back end. The central axial abutment surface is located axially between the fastening area and the front end axial abutment surface. The central axial abutment surface is located radially outward relative to the front-end axial abutment surface. A centering sleeve is disposed in the stepped bore. The centering sleeve extends axially between a centering sleeve first axial end and a centering sleeve second axial end. A guide sleeve is disposed in the stepped bore and partially in the centering sleeve. The guide sleeve extends axially between a guide sleeve first axial end and a guide sleeve second axial end. A locking member is removably disposed in the fastening area. The locking member has a tapered abutment surface formed thereon and which faces the front end of the main body. The centering sleeve is axially retained by and between the tapered abutment surface and the central axial abutment surface. The guide sleeve is axially retained by the tapered abutment surface and the central axial abutment surface.

In some embodiments, a centering sleeve tapered abutment surface extends from the centering sleeve second axial end, towards and terminates at a centering sleeve exterior surface end portion of the centering sleeve. The centering sleeve tapered abutment surface engages the tapered abutment surface of the locking member.

In some embodiments, a guide sleeve tapered abutment surface extends from the guide sleeve second axial end towards and terminates at a guide sleeve exterior surface of the guide sleeve. The guide sleeve tapered abutment surface engages the tapered abutment surface of the locking member.

In some embodiments, the guide sleeve includes a lip which extends axially from the guide sleeve first axial end towards the guide sleeve second axial end and terminates at a guide sleeve axial biasing unit receiving surface of the guide sleeve. The guide sleeve axial biasing unit receiving surface faces the guide sleeve first axial end.

In some embodiments, a first biasing member receiving pocket is formed axially between the guide sleeve axial biasing unit receiving surface and the front-end axial abutment surface. The first biasing member receiving pocket is bounded by a radially outward facing surface of the lip. A first biasing member is disposed in the first biasing member receiving pocket. The first biasing member engages the guide sleeve axial biasing unit receiving surface and the front-end axial abutment surface. The first biasing member urges the guide sleeve towards the locking member tapered abutment surface so that the guide sleeve tapered abutment surface engages the locking member tapered abutment surface.

In some embodiments, the centering sleeve includes a substantially cylindrical exterior portion that extends from the centering sleeve first axial end to a radially outward projecting centering sleeve flange. The centering sleeve flange has a centering sleeve axial biasing unit receiving surface which faces toward the centering sleeve first axial end. A second biasing member receiving pocket is formed axially between the centering sleeve axial biasing unit receiving surface and the back-end axial abutment surface. A second biasing unit is disposed in the second biasing member receiving pocket. The second biasing unit engages the centering sleeve axial biasing unit receiving surface and the back-end axial abutment surface. The second biasing unit urges the centering sleeve away from the back-end axial abutment surface so that the centering sleeve tapered abutment surface engages the locking member tapered abutment surface.

In some embodiments, the stepped bore of the main body includes a conical main-body taper that expands outwardly towards the front end. The conical main-body taper is configured to receive a tool holding portion of a collet. The tool holding portion has a tapered exterior surface that is configured to frictionally engage the conical main-body taper.

In some embodiments, the stepped bore of the main body has a recess located proximate the front end. An annular insert is disposed in the recess and has a tapered interior surface formed on a portion thereof. The tapered interior surface is configured to receive a tool holding portion of a collet. The tool holding portion has a tapered exterior surface which is configured to engage the tapered interior surface.

In some embodiments, the annular insert is made from a carbide material.

In some embodiments, the guide sleeve first axial end is spaced apart from the tapered exterior surface in a direction away from the front end and towards the back end along the elongate cylindrical portion.

DETAILED DESCRIPTION

Figure 1A:
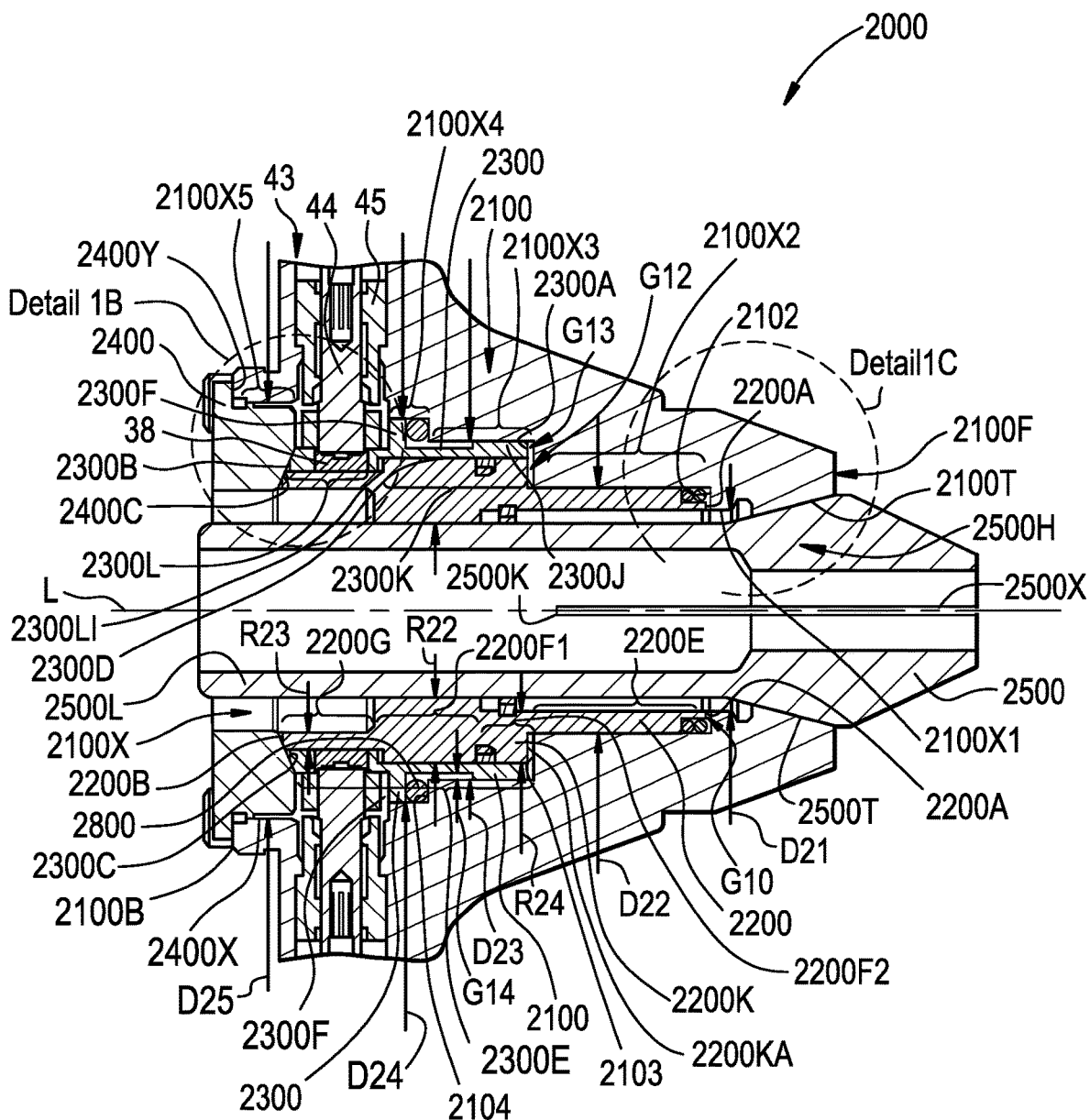
FIG. 1A is a cross sectional view of the clamping device of the present invention.
Figure 1B:
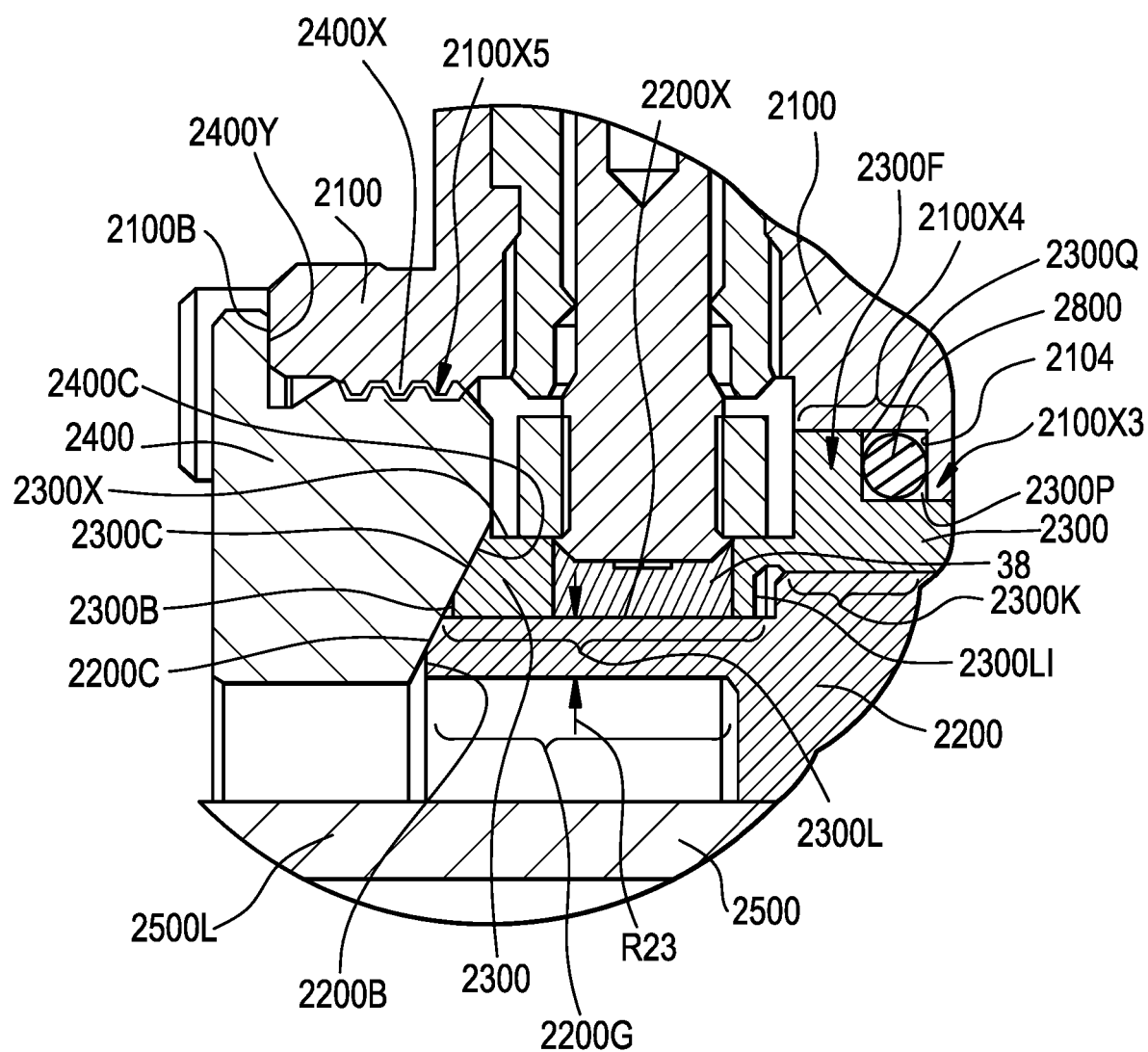
FIG. 1B is an enlarged view of detail 1B of the clamping device of FIG. 1A.
Figure 1C:
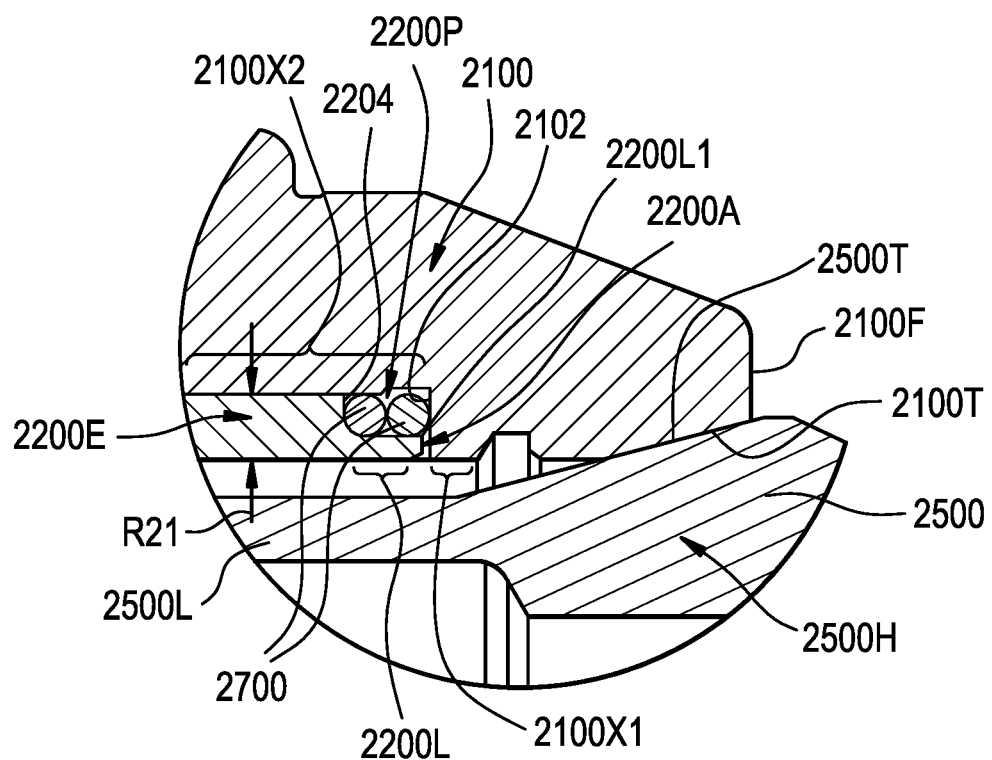
FIG. 1C is an enlarged view of detail 1C of the clamping device of FIG. 1A.

As shown in FIGS. 1A, 1B and 1C, the clamping device of the present invention is designated with the numeral 2000. As shown in FIG. 1A, the clamping device 2000 includes a main body 2100 that has a stepped bore 2100X extending therethrough from a back end 2100B to a front end 2100F thereof. The stepped bore 2100X has a conical main-body taper 2100T located proximate the front end 2100F. The stepped bore 2100X has a first cylindrical interior surface 2100X1 located proximate to the conical main-body taper 2100T and has a first inside diameter D21. The stepped bore 2100X has a second cylindrical interior surface 2100X2 that is located proximate to and radially outward relative to the first cylindrical interior surface 2100X1. The second cylindrical interior surface 2100X2 has a second inside diameter D22. The stepped bore 2100X has a third cylindrical interior surface 2100X3 located proximate to and radially outward relative to the second cylindrical interior surface 2100X2. The third cylindrical interior surface 2100X3 has a third inside diameter D23. The stepped bore 2100X has a fourth cylindrical interior surface 2100X4 located proximate to and radially outward relative to the third cylindrical interior surface 2100X3. The fourth cylindrical interior surface 2100X4 has a fourth inside diameter D24. The stepped bore 2100X has a fastening area 2100X5 that is a cylindrical interior surface that is located axially between the fourth cylindrical interior surface 2100X4 and the back end 2100B of the main body. The fastening area 2100X5 is located radially outward relative to the fourth cylindrical interior surface 2100X4 and has a fifth inside diameter D25. A portion of the fastening area 2100X5 has a female thread formed thereon. The stepped bore 2100X is symmetric about a longitudinal axis L thereof.

As shown in FIG. 1A, the second cylindrical interior surface 2100X2 is located axially between the first cylindrical interior surface 2100X1 and the third cylindrical interior surface 2100X3. The third cylindrical interior surface 2100X3 is located axially between the second cylindrical interior surface 2100X2 and the fourth cylindrical interior surface 2100X4. The fourth cylindrical interior surface 2100X4 is located axially between the third cylindrical interior surface 2100X3 and the fastening area 2100X5. The first inside diameter D21 is less than the second inside diameter D22. The third inside diameter D23 is greater than the second inside diameter D22. The third inside diameter D23 is greater than the first inside diameter D21. The fourth inside diameter D24 is greater than the third inside diameter D23. The fifth inside diameter D25 is greater than the fourth inside diameter D24.

As shown in FIG. 1A, a front-end axial abutment surface 2102 axially faces the back end 2100B of the main body 2100. The front-end axial abutment surface 2102 is annular and extends radially between the first cylindrical interior surface 2100X1 and the second cylindrical interior surface 2100X2 of the stepped bore 2100X. A central axial abutment surface 2103 axially faces the back end 2100B of the main body 2100. The central axial abutment surface 2103 is annular and extends radially between the second cylindrical interior surface 2100X2 and the third cylindrical interior surface 2100X3 of the stepped bore 2100X. A back-end axial abutment surface 2104 axially faces the back end 2100B of the main body 2100. The back-end axial abutment surface 2104 is annular and extends between the third cylindrical interior surface 2100X3 and the fourth cylindrical interior surface 2100X4 of the stepped bore 2100X. The central axial abutment surface 2103 is located axially between the front-end axial abutment surface 2102 and the back end 2100B. In particular, the central axial abutment surface 2103 is located axially between the front-end axial abutment surface 2102 and the back-end axial abutment surface 2104 and radially outward relative to the front-end axial abutment surface 2102. The front-end axial abutment surface 2102 is spaced apart from the conical main-body taper 2100T by the first cylindrical interior surface 2100X1.

As shown in FIG. 1A, a centering sleeve 2300 is positioned proximate to the third cylindrical interior surface 2100X3 of the stepped bore 2100X. The centering sleeve 2300 has a centering sleeve first axial end 2300A and a centering sleeve second axial end 2300B. The centering sleeve first axial end 2300A engages the central axial abutment surface 2103 when the biasing unit 2800 is compressed such that the centering sleeve 2300 is moved toward the front end 2100F and the centering sleeve first axial end 2300A is spaced apart from the central axial abutment surface 2103 by a gap G13 when the biasing unit 2800 is expanded such that the centering sleeve 2300 moves toward the back end 2100B. A centering sleeve tapered abutment surface 2300C extends from the centering sleeve second axial end 2300B towards and terminates at a centering sleeve exterior surface end portion 2300X of the centering sleeve exterior surface 2300E. The centering sleeve tapered abutment surface 2300C tapers in a direction towards the centering sleeve first axial end 2300A. The centering sleeve 2300 has an interior surface 2300D and an exterior surface 2300E both extending between the centering sleeve first axial end 2300A and the centering sleeve second axial end 2300B thereof.

As shown in FIGS. 1A and 1B, the interior surface 2300D of the centering sleeve 2300 has a substantially cylindrical portion 2300K extending from the centering sleeve first axial end 2300A to a radially inward projecting lobe 2300L. The lobe 2300L extends from a first axial abutment surface 2300L1 to the centering sleeve second axial end 2300B.

The exterior surface 2300E of the centering sleeve 2300 has a substantially cylindrical exterior portion 2300J from the centering sleeve first axial end 2300A to a radially outward projecting centering sleeve flange 2300F. The cylindrical portion 2300J has an outside diameter that is slightly less than the third inside diameter D23 of the main body 2100. The centering sleeve flange 2300F has an outside diameter that is slightly less than the fourth inside diameter D24 of the main body 2100 thereby forming an annular gap G14 between the centering sleeve 2300 and the main body 2100. The centering sleeve flange 2300F has a centering sleeve axial biasing unit receiving surface 2300Q which faces toward the centering sleeve first axial end 2300A.

As shown in FIG. 1A, a guide sleeve 2200 extends from a guide sleeve first axial end 2200A to a guide sleeve second axial end 2200B thereof. The guide sleeve 2200 is disposed in the main body 2100 with the guide sleeve first axial end 2200A spaced apart from the front end 2100F of the main body 2100 and a portion of the guide sleeve 2200 proximate the guide sleeve second axial end 2200B is disposed in the centering sleeve 2300. The guide sleeve 2200 has a first radial thickness R21 (see FIG. 1C) along a portion of a first segment 2200E proximate the guide sleeve first axial end 2200A. As shown in FIG. 1B, the guide sleeve 2200 has a third radial thickness R23 along a third segment 2200G proximate the guide sleeve second axial end 2200B. The guide sleeve 2200 has a second radial thickness R22 along a second segment 2200F1 located between the first segment 2200E and the third segment 2200G. The guide sleeve 2200 has a fourth radial thickness R24 (see FIG. 1A) along a fourth segment 2200K (shown by bracket 2200F2) located between the first segment 2200E and the second segment 2200F1. The fourth segment 2200K terminates at a guide sleeve central limit-stop 2200KA that faces axially towards the front end 2100F. A guide sleeve tapered abutment surface 2200C extends from the guide sleeve second axial end 2200B towards and terminates at a guide sleeve exterior surface 2200X of the third segment 2200G of the guide sleeve 2200. The guide sleeve tapered abutment surface 2200C tapers in a direction towards the guide sleeve first axial end 2200A.

As shown in FIG. 1C, the first segment 2200E of the guide sleeve 2200 has a lip 2200L extending axially from the guide sleeve first axial end 2200A towards the guide sleeve second axial end 2200B and terminating at a guide sleeve axial biasing unit receiving surface 2204 of the guide sleeve 2200, that faces the guide sleeve first axial end 2200A of the guide sleeve 2200.

As shown in FIG. 1C, a first biasing member receiving pocket 2200P is formed axially between the guide sleeve axial biasing unit receiving surface 2204, and the front-end axial abutment surface 2102. The first biasing member receiving pocket 2200P is bounded by a radially outward facing surface 2200L1 of the lip 2200L. A first biasing member 2700 (e.g., one or more coil springs, one or more canted coil springs, a disc spring assembly, combinations thereof or the like) is disposed in the first biasing member receiving pocket 2200P. The first biasing member 2700 engages the guide sleeve axial biasing unit receiving surface 2204 and the front-end axial abutment surface 2102. The first biasing member 2700 urges the guide sleeve 2200 away from the front-end axial abutment surface 2102, away from the central axial abutment surface 2103 and towards the locking member tapered abutment surface 2400C so that the guide sleeve tapered abutment surface 2200C engages the locking member tapered abutment surface 2400C and so that a first axial gap G10 is formed between the front-end axial abutment surface 2102 and the guide sleeve first axial end 2200A and a second axial gap G12 is formed between the central axial abutment surface 2103 and the guide sleeve central limit-stop 2200KA. When the biasing members 2700 are compressed the guide sleeve moves toward the front end 2100F and the front-end axial abutment surface 2102 engages the guide sleeve first axial end 2200A and/or the central axial abutment surface 2103 engages the guide sleeve central limit-stop 2200KA. In the embodiment depicted in FIGS. 1A and 1C two first biasing members 2700 are disposed in the first biasing member receiving pocket 2200P.

The guide sleeve 2200 is inserted into the main body 2100 through the back end 2100B which makes it easier to assembly and provides more security in function, because the guide sleeve 2200 cannot glide out the main body 2100, when moving the collet 2500 forward. As soon as the guide sleeve 2200 moves forward toward the front end 2100F a certain small distance, the guide sleeve 2200 is stopped by the front-end axial abutment surface 2102 in the main body 2100.

As shown in FIGS. 1A and 1B, a locking member (e.g., a nut with male threads) 2400 is disposed in (e.g., threaded into) the fastening area 2100X5 of the main body 2100. The fastening area 2100X5 has a female thread formed on a portion thereof. The locking member 2400 includes a male thread 2400X that threads into the female thread formed in the fastening area 2100X5 of the main body 2100. The locking member 2400 includes a locking member tapered abutment surface 2400C that engages the centering sleeve tapered abutment surface 2300C of the centering sleeve 2300 to axially retain the centering sleeve 2300 between the locking member 2400 and the main body 2100. The locking member 2400 has an axially inward facing limit stop 2400Y that abuts the second end 2100B of the main body 2100 to limit axial movement of the locking member 2400 in the direction towards the front end 2100F. Since the guide sleeve tapered abutment surface 2200C and the centering sleeve tapered abutment surface 2300C both engage the locking member tapered abutment surface 2400C, improved protection against contamination of the internals of the clamping device 2000 by dust, liquid, dirt and other contaminants is achieved.

As shown in FIGS. 1A, 1B and 1C a collet 2500 is disposed in the main body 2100. The collet 2500 has a tool holding portion 2500H that has a tapered exterior surface 2500T and that transitions into an elongate cylindrical portion 2500L. The collet 2500 includes longitudinally extending slits 2500X that extend from and axially through the tool holding portion 2500H and terminate at an intermediate portion 2500K of the elongate cylindrical portion 2500L. The tapered exterior surface 2500T of the tool holding portion 2500H engages the conical main-body taper 2100T of the main body 2100. An exterior surface of the elongate cylindrical portion 2500L is radially spaced apart from the first segment 2200E. The elongate cylindrical portion 2500L is radially guided by the second segment 2200F1 of the guide sleeve 2200. The second segments 2200F1 and fourth segment 2200K (shown by bracket 2200F2) are centered by an interior surface of the cylindrical portion 2300K of the centering sleeve 2300. Thus, the centering sleeve 2300 is sized to be used with various sizes of collets 2500 and guide sleeves 2200 without having to replace the centering sleeve 2300 for each different sized collet 2500 and guide sleeve 2200. In the embodiment depicted in FIGS. 1A, 1B and 1C, the guide sleeve first axial end 2200A is spaced apart from the tapered exterior surface 2500T in a direction away from the front end 2100F and towards the back end 2100B, along the elongate cylindrical portion 2500L.

As shown in FIG. 1B, a, second biasing member receiving pocket 2300P is formed axially between the centering sleeve axial biasing unit receiving surface 2300Q of the centering sleeve flange 2300F and the back-end axial abutment surface 2104. A second biasing unit 2800 (e.g., one or more coil springs, one or more canted coil springs, a disc spring assembly, combinations thereof or the like) is disposed in the second biasing member receiving pocket 2300P. The second biasing unit 2800 engages the centering sleeve axial biasing unit receiving surface 2300Q and the back-end axial abutment surface 2104. The second biasing unit 2800 urges the centering sleeve 2300 away from the back-end axial abutment surface 2104 towards the locking member tapered abutment surface 2400C, so that the centering sleeve tapered abutment surface 2300C engages the locking member tapered abutment surface 2400C and the gap G13 is formed between the central axial abutment surface 2103 and the centering sleeve first axial end 2300A. When the biasing member 2800 is compressed the centering sleeve 2300 moves toward the front end 2100F and the centering sleeve first axial end 2300A engages the central axial abutment surface 2103.

As shown in FIG. 1A, two of six circumferentially equidistantly spaced radial bores 43 are shown extending through the main body 2100. A threaded insert 45 is disposed in each of the six radial bores, for example, by a screwed or press fit engagement. A differential screw 44 is located in each of the respective threaded inserts 45 in the main body 2100. Each of the differential screws 44 are in communication with a respective adjusting sledge 38 to facilitate the adjustment of the collet 2500 clamped in the clamping device 2000. Each of the adjusting sledges 38 are seated in a respective aperture in the centering sleeve 2300. The differential screws 44 are generally located equidistantly around the circumference of the main body 2100. The adjusting sledge 38 can be adjusted to center and stabilize the collet 2500 in the main body 2100 by tightening or loosening the differential screws 44 using a tool such as a screwdriver, a Hex-key or the like. The application of force by the differential screws 44 via the adjusting sledge 38 resiliently and radially deforms the guide sleeve 2200 (e.g., in the micrometer range), thus reducing clearance in relation to the bore of the clamping device 2000 and thereby improving repeat accuracy.

Figure 2A:
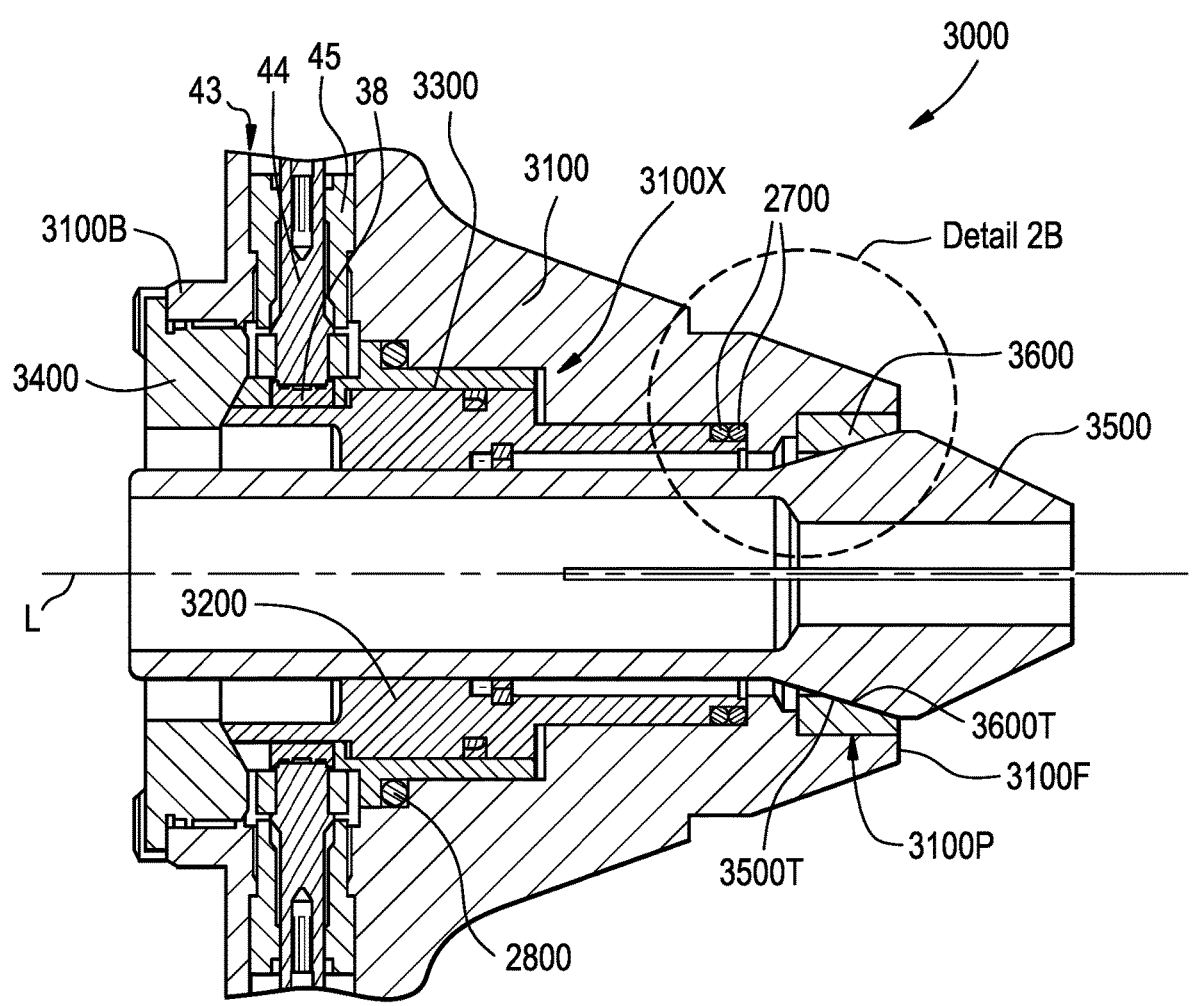
FIG. 2A is a cross sectional view of the clamping device of the present invention, shown with a front end insert.
Figure 2B:
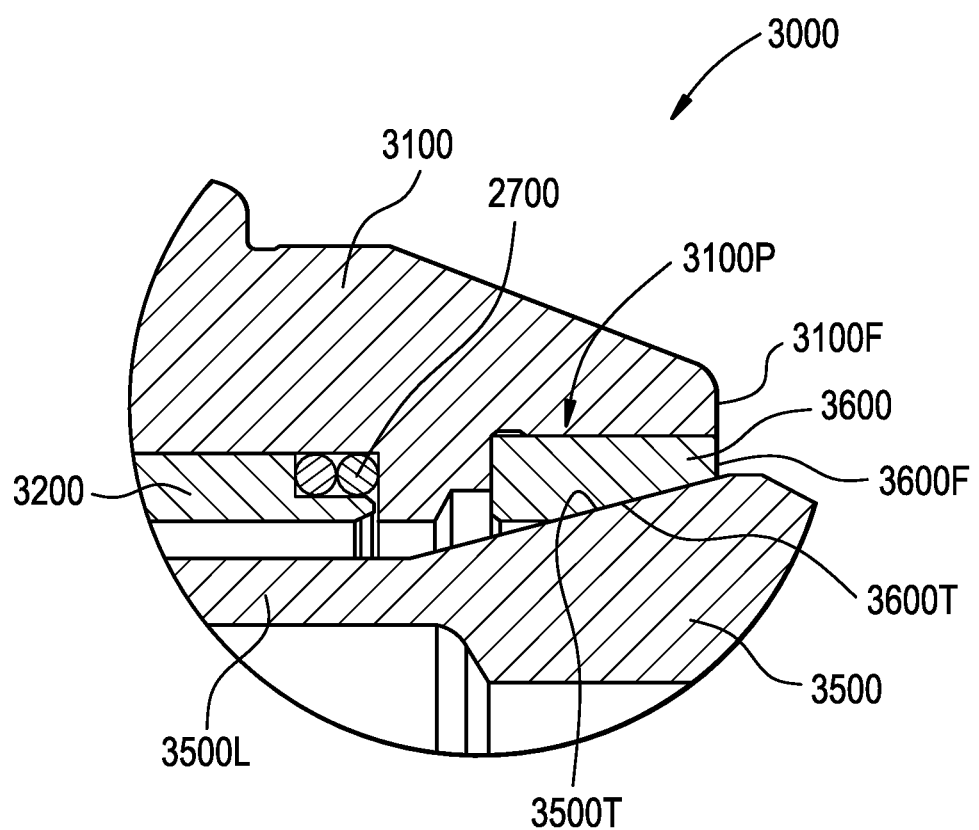
FIG. 2B is an enlarged view of detail 2B of the clamping device of FIG. 2A.

As shown in FIGS. 2A and 2B the clamping device 3000 is similar to the clamping device 2000 illustrated in FIGS. 1A, 1B and 1C. Thus, element numbers of the components of the clamping device 3000 are designated with similar element numbers as those employed for the clamping device 2000 with the first numeral "2" replaced with the numeral "3." The clamping device 3000 includes a main body 3100 that has a stepped bore 3100X extending therethrough from a back end 3100B to a front end 3100F thereof. The stepped bore 3100X has a recess 3100P located proximate the front end 3100F that replaces the conical main-body taper 2100T in the clamping device 2000. An annular insert 3600 is disposed in (e.g., press fit in) the recess 3100P. The annular insert 3600 has a tapered interior surface 3600T formed on a portion thereof. The annular insert 3600 is an optional embodiment that modifies the clamping device 2000. The annular insert 3600 is manufactured from a hardened metallic material such as carbide to increase rigidity and reduce runout.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A clamping device for clamping a tool or work piece, the clamping device comprising:
   a main body having a stepped bore extending from a back end to a front end thereof, the stepped bore having a fastening area located proximate the back end, a front-end axial abutment surface axially facing the back end and a central axial abutment surface axially facing the back end and located axially between the fastening area and the front-end axial abutment surface, the central axial abutment surface being located radially outward relative to the front-end axial abutment surface;
   a centering sleeve disposed in the stepped bore, the centering sleeve extending axially between a centering sleeve first axial end and a centering sleeve second axial end;
   a guide sleeve disposed in the stepped bore and partially in the centering sleeve, the guide sleeve extending axially between a guide sleeve first axial end and a guide sleeve second axial end;
   a locking member removably disposed in the fastening area, the locking member having a tapered abutment surface formed thereon and facing the front end of the main body;
   the centering sleeve being axially retained by and between the tapered abutment surface and the central axial abutment surface; and
   the guide sleeve being axially retained by the tapered abutment surface and the central axial abutment surface.

2. The clamping device of claim 1, wherein a centering sleeve tapered abutment surface extends from the centering sleeve second axial end towards and terminates at a centering sleeve exterior surface end portion of the centering sleeve; and
   the centering sleeve tapered abutment surface engages the tapered abutment surface of the locking member.

3. The clamping device of claim 1, wherein a guide sleeve tapered abutment surface extends from the guide sleeve second axial end towards and terminates at a guide sleeve exterior surface of the guide sleeve; and
   a guide sleeve tapered abutment surface engages the tapered abutment surface of the locking member.

4. The clamping device of claim 1, wherein the guide sleeve comprises a lip extending axially from the guide sleeve first axial end towards the guide sleeve second axial end and terminating at a guide sleeve axial biasing unit receiving surface of the guide sleeve, the guide sleeve axial biasing unit receiving surface faces the guide sleeve first axial end;

a first biasing member receiving pocket formed axially between the guide sleeve axial biasing unit receiving surface and the front-end axial abutment surface, the first biasing member receiving pocket being bounded by a radially outward facing surface of the lip; and a first biasing member being disposed in the first biasing member receiving pocket, the first biasing member engaging the guide sleeve axial biasing unit receiving surface and the front-end axial abutment surface and the first biasing member urges the guide sleeve towards the tapered abutment surface of the locking member so that a guide sleeve tapered abutment surface engages the tapered abutment surface of the locking member.

5. The clamping device of claim 1, wherein the centering sleeve comprises a substantially cylindrical exterior portion extending from the centering sleeve first axial end to a radially outward projecting centering sleeve flange, the centering sleeve flange having a centering sleeve axial biasing unit receiving surface which faces toward the centering sleeve first axial end;

a second biasing member receiving pocket is formed axially between the centering sleeve axial biasing unit receiving surface and a back-end axial abutment surface; and a second biasing unit is disposed in the second biasing member receiving pocket, the second biasing unit engaging the centering sleeve axial biasing unit receiving surface and the back-end axial abutment surface, the second biasing unit urging the centering sleeve away from the back-end axial abutment surface so that a centering sleeve tapered abutment surface engages the tapered abutment surface of the locking member.

6. The clamping device of claim 1, wherein the stepped bore of the main body comprises a conical main-body taper expanding outwardly towards the front end, the conical main-body taper being configured to receive a tool holding portion of a collet, the tool holding portion having a tapered exterior surface that is configured to frictionally engage the conical main-body taper.

7. The clamping device of claim 6, wherein the guide sleeve first axial end is spaced apart from the tapered exterior surface in a direction away from the front end and towards the back end along an elongate cylindrical portion.

8. The clamping device of claim 1, wherein the stepped bore of the main body comprises a recess located proximate the front end and an annular insert is disposed in the recess, the annular insert having a tapered interior surface formed on a portion thereof, the tapered interior surface being configured to receive a tool holding portion of a collet, the tool holding portion having a tapered exterior surface.

9. The clamping device of claim 8, wherein the annular insert comprises a carbide material.

* * * * *